United States Patent [19]
Roth et al.

[11] Patent Number: 4,965,864
[45] Date of Patent: Oct. 23, 1990

[54] LINEAR MOTOR

[76] Inventors: Paul E. Roth, 2932 N. Casa Tomas, Phoenix, Ariz. 85016; Bruce A. Roth, 4756 W. Michigan, Glendale, Ariz. 85308

[21] Appl. No.: 129,541

[22] Filed: Dec. 7, 1987

[51] Int. Cl.$^5$ ............................................. H02K 41/00
[52] U.S. Cl. ..................................... 318/135; 318/132; 310/12; 310/16; 310/17; 310/27; 324/207.35; 417/417; 417/418
[58] Field of Search ........................ 310/12, 13, 15, 14, 310/16, 34, 35, 17, 30, 27, 43; 318/132, 135; 200/82 E; 324/207, 208; 417/45, 416, 417, 418

[56] References Cited
U.S. PATENT DOCUMENTS

| | | | |
|---|---|---|---|
| 2,701,331 | 2/1955 | Holst | 310/35 |
| 3,754,154 | 8/1973 | Massie | 310/30 |
| 3,827,141 | 8/1974 | Hallerback | 310/43 |
| 3,846,682 | 11/1974 | Massie | 310/34 |
| 3,884,125 | 5/1975 | Massie | 92/13.6 |
| 3,981,245 | 9/1975 | Buzzell | 310/12 |
| 4,053,975 | 10/1977 | Olbrich | 310/27 |
| 4,389,849 | 6/1983 | Beggs | 310/15 |
| 4,541,787 | 9/1985 | De Long | 310/35 |
| 4,595,870 | 6/1986 | Chitayat | 318/135 |

FOREIGN PATENT DOCUMENTS 3046048  8/1982  Fed. Rep. of Germany ...... 417/418

Primary Examiner—R. Skudy
Attorney, Agent, or Firm—Cahill, Sutton & Thomas

[57] ABSTRACT

An electromechanical linear motor incorporating a number of electrically conductive drive coils arranged axially and embedded in a composite matrix so as to form a hollow cylinder within which a piston or pistons are placed. Permanent magnets or conductive coils arranged around the circumference of the pistons interact through magnetic coupling with the drive coils so as to cause the piston to move in accordance with the currents applied to the drive coils. These currents are supplied through logic control circuitry which receives inputs from a number of sensors including piston position sensors, thermostats, pressure transducers and timers. Based on the information received from these sensors, a microprocessor controlled power circuit provides electrical pulses of a frequency, amplitude and duration designed to produce piston motion appropriate to the specific application.

4 Claims, 5 Drawing Sheets

LINEAR MOTOR

FIELD OF THE INVENTION

The present invention pertains to the field of electric motors, and more particularly, to linear motors.

BACKGROUND OF THE INVENTION

Electric motors for converting electrical energy into rotary motion are highly efficient devices, particularly in the larger sizes, but much of this efficiency is lost in the process of converting this rotary motion into linear or reciprocating motion as is necessary in some machines, such as reciprocating pumps and positioning equipment.

As used herein, the term linear pump or motor means a device having a piston that translates along its axis rather than rotating about its axis; the axis along which the piston travels may be a straight line, or curved line, or a combination of both. The two principal obstacles to the development of an efficient linear motor have been the difficulty of establishing tight flux linkages between the stator and armature, and the complexity of the control circuitry needed to drive the motor.

Previous efforts have incorporated permanent magnets with poles facing axially toward the ends of the cylinders. In order to establish adequate coupling in this configuration pole pieces have sometimes been used in the ends of the working cylinder, in which case stroke length is severely limited as shown in U.S. Pat. No. 2,701,331 to Holst and U.S. Pat. Nos. 3,754,154, 3,846,682 and 3,884,125 to Massie. The concept of using a plurality of coils has been investigated as shown in U.S. Pat. No. 4,541,787 to Delong, but at the cost of good magnetic coupling between drive coils and piston. These designs also called for relatively thick metallic cylinders, further reducing magnetic coupling and introducing the additional complication of induced eddy currents in the cylinder caused by the electrical current in the drive coils.

Rotating synchronous electrical machinery has an advantage over linear equipment in that some slippage is allowable. If magnetic coupling between stator and armature poles is lost in a rotating magnetic field such as is encountered in ordinary induction motors it is quickly reestablished with the following armature pole, and the result is only a minor loss of efficiency. In a linear motor, loss of magnetic coupling results in erratic behavior or complete motor stoppage. In the prior art, drive coil currents were controlled by passive circuitry such as mechanical switching or electronic oscillators, and currents were applied without reference to the actual position of the piston. Such a motor would operate efficiently only in a very narrow range of conditions, and would not operate at all if momentarily overloaded. In the present invention this difficulty has been overcome by the use of electronic circuitry capable of sensing piston or armature position and supplying current pulses so as to eliminate slippage.

OBJECTS OF THE INVENTION

It is therefore an object of the present invention to provide an improved linear motor.

It is also an object of the present invention to provide a linear motor incorporating a highly efficient flux linkage between piston and enclosing cylinder.

It is another object of the present invention to provide a linear motor having drive coils energized in accordance with signals derived from motor piston position and acceleration.

It is also an object of the present invention to provide a linear motor adaptable for use in a variety of applications such as a pump or compressor wherein a working fluid is transported through the motor by pistons whose position and velocity are controlled by the motor.

It is also an object of the present invention to provide a linear motor that is adaptable for efficient use in many applications heretofore inappropriate for prior art linear motors.

These and other objects of the present invention will become apparent to those skilled in the art as the description thereof proceeds.

SUMMARY OF THE INVENTION

Briefly, in accordance with one embodiment chosen for illustration, a linear pump or compressor is provided with a plurality of drive coils arranged circumferentially about a cylinder with the coils displaced with respect to each other longitudinally along the cylinder. The coils are imbedded in a matrix of plastic material which forms the body of a cylinder to provide a passageway for a piston positioned therein. The piston is provided with a plurality of arcuate permanent magnets each of which is permanently magnetized to provide an exposed north and south pole adjacent the outer surface of the piston. In this manner, the flex emanating from the permanent magnets is directed perpendicularly to the cylinder wall.

The drive coils are energized in a sequential manner in accordance with a control circuit that is utilized to detect several parameters within the system. The detected parameters include piston position as well as cylinder pressure. The coils are energized to create force upon the piston causing the piston to move along the cylinder axis to compress a fluid therein.

BRIEF DESCRIPTION OF THE DRAWINGS

The present invention may more readily be described by reference to the accompanying drawings in which:

FIGS. 9a and 9b are schematic representations of pistons and cylinders constructed in accordance with the prior art and in accordance with the invention respectively, useful for illustrating the flux pattern differences between prior art devices and the present invention.

DETAILED DESCRIPTION OF THE PREFERRED EMBODIMENT

Figure 1:
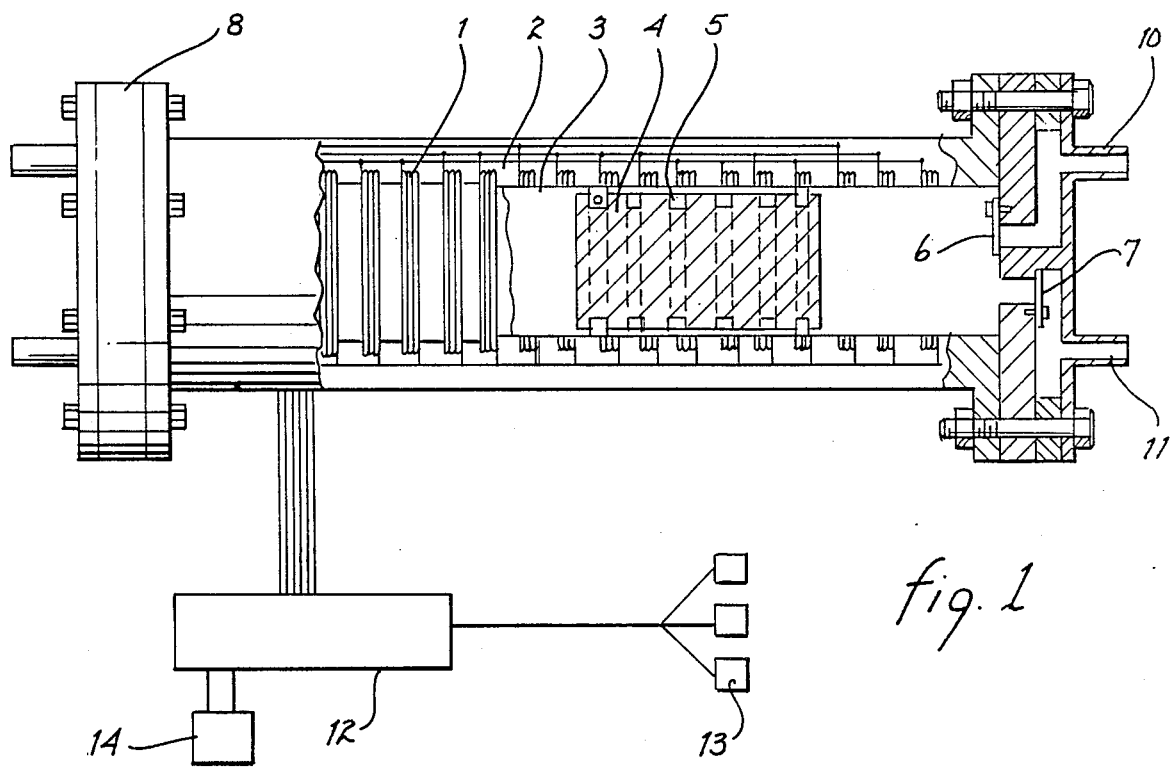
FIG. 1 is a schematic illustration of the present invention in the form of a compressor incorporating a single piston.

Referring now to FIG. 1, a number of drive coils 1 are arranged along a central axis so as to describe a cylinder and are then embedded or potted in a matrix of epoxy, ceramic, or thermoplastic which forms the body of the device 2. It may be noted that the cross-section of the "cylinder" need not be circular. That is, there may be applications wherein an elliptical, rectangular, or even an asymmetrical cross-section would be appropriate. Therefore, as used herein, the term "cylindrical" or "cylinder" means a chamber having any of those cross-sections or any other cross-sectional configuration perpendicular to a defined axis. A thin, non-structural cylinder liner 3 of non-magnetic, non-conductive material such as Teflon ®, ceramic material or Mylar ® is used to form a smooth inner surface for sealing against the piston rings (not shown in FIG. 1) and to provide electrical insulation between the piston 4 and the drive coils 1. The piston and cylinder form an annular gap; magnets or conductive coils 5 within the piston interact with the magnetic field produced by currents flowing in the drive coils 1 in such a way as to produce forces acting on the piston 5 which cause the piston to move. Intake 6 and exhaust 7 valves are located in end caps or heads 8 which are affixed to the body of the compressor. These heads contain inlet and outlet ports 10, 11 which direct a working fluid to the appropriate location. Alternately, as is well understood in the prior art relating to compressors, valves may be installed in the piston.

The logic control circuitry 12, comprises a microprocessor and other electronic devices as appropriate to the specific application. This control circuitry receives input from a variety of sensors 13 which may include piston position sensors, thermostats, pressure transducers, remote computers, and timers. The microprocessor performs calculations based on algorithms appropriate to the specific application and delivers current pulses to selected drive coils 1 in such a way as to produce the desired piston motion. Electrical energy is drawn from the power supply 14 which may be line current, battery, or other source of electricity.

Figure 2:
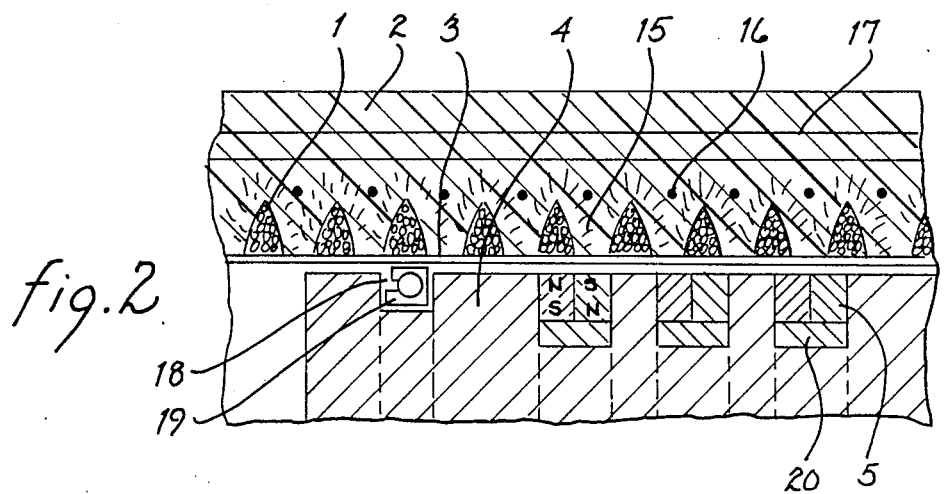
FIG. 2 is a cross-sectional configuration of a portion of the cylinder and piston, slightly modified, shown in FIG. 1.

FIG. 2 is a detailed cross-sectional view of the pump body 2 and piston 4 showing how permanent magnets 5 may be arranged in order to maximize air gap flux density and magnetic linkage with the drive coils 1. In this illustration soft iron filings 15 are shown mixed into the epoxy potting medium. The drive coils 1 have been energized while the potting medium cured, causing the filings to align in the optimum configuration to concentrate the magnetic flux produced by the drive coils into the annular air gap formed between the cylinder liner and the magnets or conductive coils 5. Also shown in this view are reinforcing circumferential 16 and axial (or longitudinal) fibers 17 of glass, Kelvar ®, or other appropriate material. Near either end of the piston, grooves such as that shown at 18 may be formed into the body of the piston to retain a seal or piston ring 19. A further detail shown in this view is the presence of a "back" iron 20 (a soft iron strap) which may be incorporated into the design to furnish a flux path when separate magnets ar used to provide North and South poles as shown.

Figure 3:
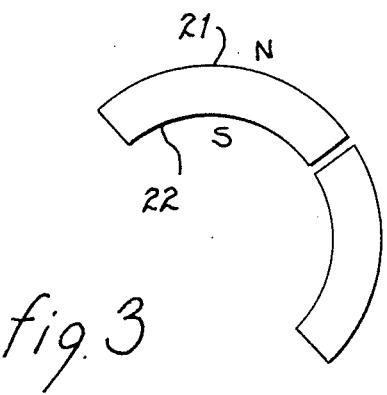
FIG. 3 is an illustration of suitable permanent magnets for use in the embodiment of FIGS. 1 and 2.

FIG. 3 shows a detail of how permanent magnets used in the piston may be formed. Each individual magnet is made in the form o an arc and radially magnetized; that is, the outer face 21 carries one pole and the inner face 22 carries the opposite pole. A number of such arc shaped magnets sufficient to encircle the piston are set into a groove formed in the piston as shown in FIG. 2. Two such sets of magnets with opposite orientation along with a back iron formed into a mating arc is set into each groove. An appropriate number of such sets is placed in the groove to fill the circumferential extent of the groove. Neither permanent magnets nor back irons should form an electrically continuous ring; such continuity would allow eddy currents to be generated when the drive coils 7 are pulsed. To minimize such eddy currents, a thin spacer such as that shown at 22a electrically insulates adjacent sets of magnets.

Figure 4B:
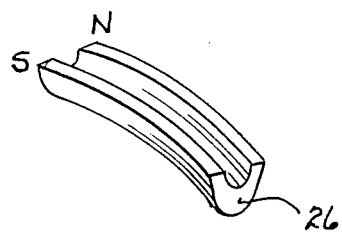
FIG. 4b is a perspective view of a permanent magnet suitable for use in the embodiment shown in FIG. 4.
Figures 4, 4A:
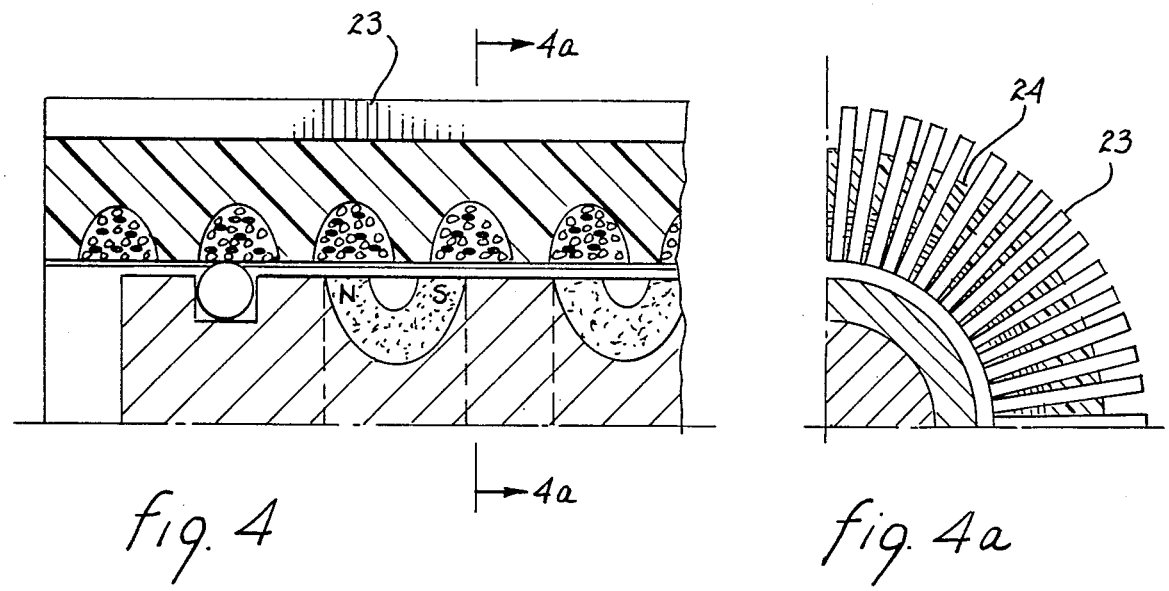
FIG. 4 is a cross-sectional configuration of another embodiment of a piston and cylinder, similar to that shown in FIG. 2, incorporating permanent magnets of different configuration as well as magnetic flux directing iron plates.
FIG. 4a is a side elevational view of the embodiment shown in FIG. 4.

FIGS. 4 and 4a show an alternate embodiment in which thin iron plates 23 of soft iron are used to direct magnetic flux, as is well understood in the prior art relating to electric motors. However, in the present invention, such iron plates extend longitudinally of the cylinder and extend radially outwardly from the cylinder's inner surface. In this illustration the iron plates have been left to protrude outside of the potting medium 24 so that they may be used to radiate excess heat. Here again, circumferential reinforcing fibers 25 are used, but in this case longitudinal reinforcement is provided by the iron plates 23. Also shown in this embodiment are permanent magnets 26 with a horseshoe or "U" shaped cross-section and magnetization. These permanent magnets are also shown in FIG. 4b. In this case no "back" iron is required. It is to be understood that these magnets have essentially the same arc shape as the combination of magnets and back iron described in FIG. 3.

Figure 5:
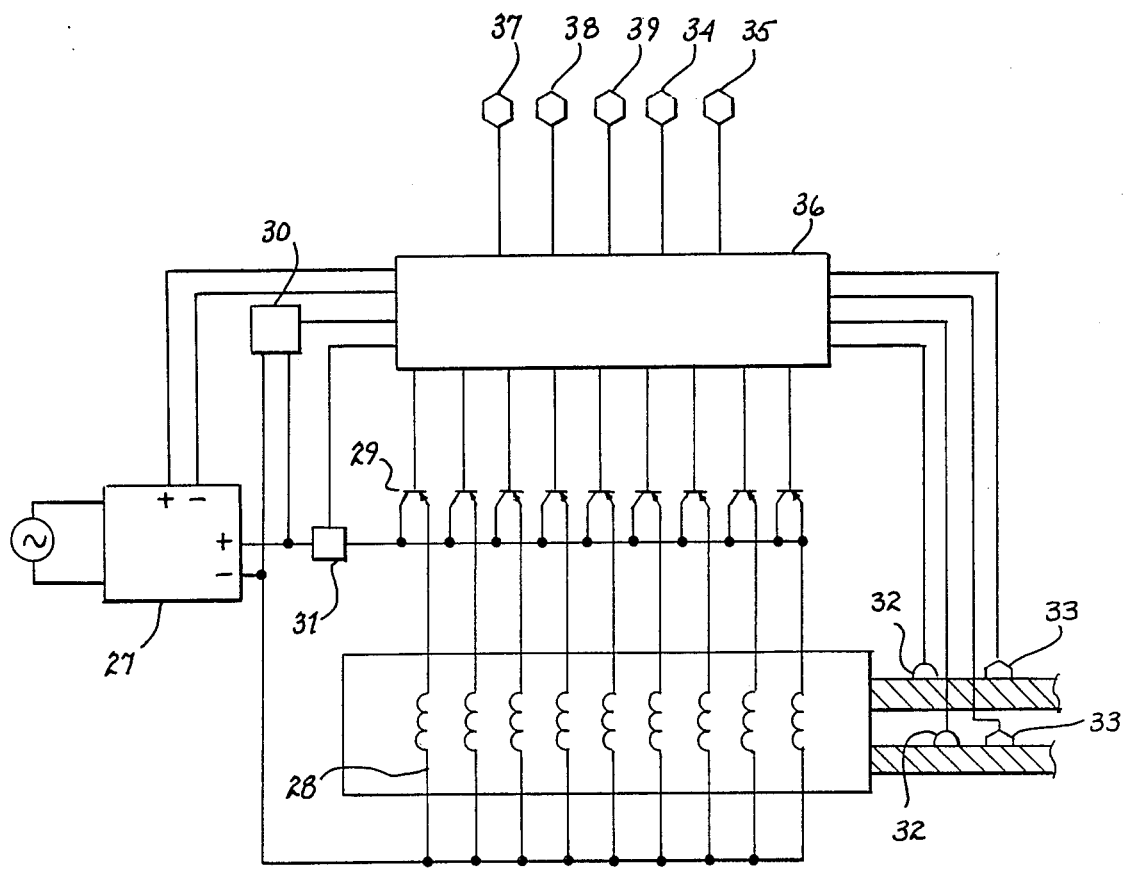
FIG. 5 is a schematic diagram of a suitable circuit for use in the embodiment of FIG. 1 useful for explaining the operation of the system.

FIG. 5 is a schematic diagram of a suitable electronic control for use in the system of the present invention when the system is applied to fluid pump environments such as compressor applications. A power supply 27 accepts AC line current and provides low voltage DC output for the microprocessor 36 and a high voltage DC output to power the drive coils 28. When an electrical pulse is applied to a drive coil 28 through a power transistor 29 (or other power switching device) voltage sensor 30 and current sensor 31 measure the instantaneous voltage across and the instantaneous current through the coil; the microprocessor 36 uses this information to compute the voltage-current lag and hence the total inductance of the drive coil self-inductance and the mutual inductance between the drive coil and the piston at the instant of measurement. Since the measurement of inductance in this manner is a function of piston position, the position and the rate of change of position (velocity) is readily calculated. High pressure side and low pressure side temperature sensors 32 and pressure sensors 33 as well as an ambient temperature sensor 34 and control thermostat 35 feed information to the microprocessor 36 which uses this information to determine the optimum speed and stroke length for the compressor. Additional interfaces are provided for controlling fans 37, valves 38, and warning devices 39. Alternately, a measurement of the current required to move the piston may be used to calculate the pressure.

Figure 6:
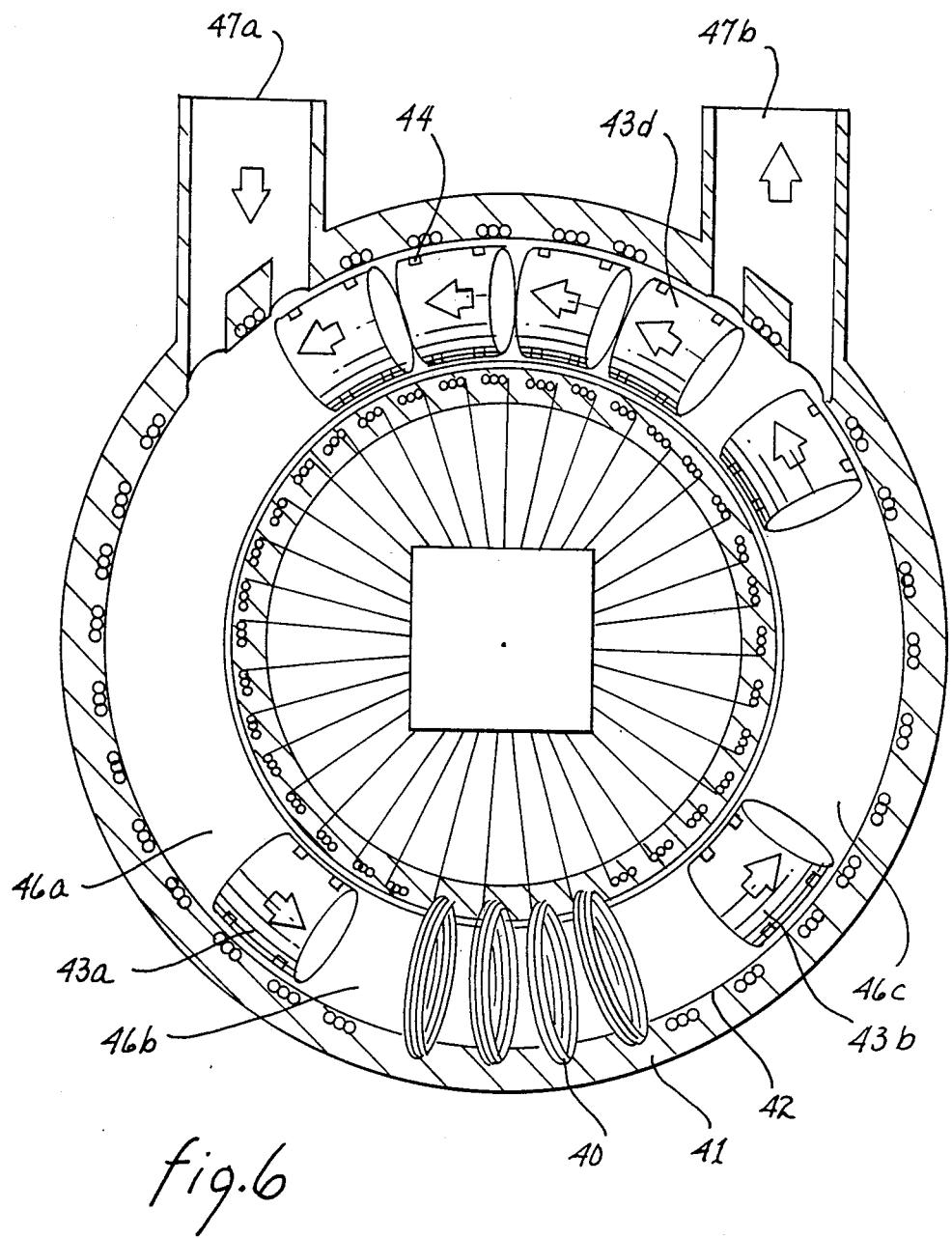
FIG. 6 is a schematic illustration of another embodiment of the linear motor of the present invention showing the system formed into a torus with multiple pistons that may be used for pumping or compressing a working fluid.

FIG. 6 illustrates an embodiment in which the straight cylinder previously described has been formed into a torus. The configuration offers advantages for the movement of fluids in that flow is continuous and in a uniform direction. The essential elements of the drive coils 40, pump body 41, cylinder liner 42, pistons 43, permanent magnets or coils 44 and logic control circuitry 45 are all unchanged except for minor differences in geometries. No distinction is made between inlet and outlet ports because the direction of flow is dependent only upon the direction of piston motion, and may easily be reversed by changing the timing of the electrical pulses supplied to the drive coils 40 The pump will work equally well in either direction. Pumping is accomplished by varying the speed with which the pistons 43 are caused to travel through various sections of the torus by the currents in the drive coils 40. In order to induce flow in the direction indicated by the arrows in FIG. 6, one of the pistons 43a is accelerated rapidly through a section of the toroidal cylinder 46a, creating a partial vacuum and drawing in the working fluid through port 47a. Velocity is maintained through sections 46b. Deceleration of the piston occurs in section 46c of the toroidal cylinder and as the piston approaches the position shown in 43c the working fluid in front of the piston is forced out through port 47b. As the originally designated piston reaches the position shown in 43d it is decelerated by the action of the drive coils 40 to a near stop, and the following piston, now at or near the position shown in 43c assists i- forcing the working fluid which the originally designated piston drew in at port 47a out of the pump body through port 47b. At least two pistons are required in this embodiment, but smoother pumping action may be accomplished by using more pistons.

Figure 7:
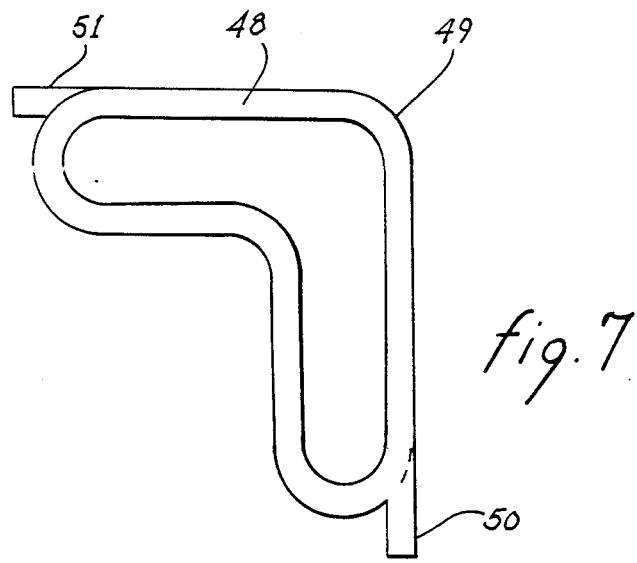
FIG. 7 is a schematic illustration of an application of the system of the present invention showing an embodiment incorporating plural curved and plural straight sections of the cylinder.

FIG. 7 shows an embodiment of the present invention as a distributed force pump of arbitrary length. Again, the essential features of radially oriented magnetic poles in the piston, close magnetic coupling, and microprocessor control remain the same as that described above, and only the treatment of the ends of the pump body are altered. Here the pump body comprises a combination o±adjacent straight 48 and curved 49 sections extending along a desired path and closing on itself. A number of pistons similar in design to those previously disclosed move within the pump according to the electrical pulses supplied by the control circuitry to the drive coils. Inlet 50 and outlet 5 of the pump may be as shown in FIG. 6. The operation of the embodiment shown in FIG. 7 is similar to that described in connection with FIG. 6. The low pressure inlet such as the inlet 50 supplies the fluid to the system at low pressure; since several pistons may be utilized in the embodiment of FIG. 7 between the inlet 50 and outlet 51, the pressure of the fluid can be significantly increased since the pressure drop across any one piston is only an increment of the pressure drop between the inlet and the outlet. Thus, the disadvantages of the utilization of a single piston within a cylinder to compress a fluid from a preselected minimum pressure to a predetermined high pressure are avoided.

Figure 8:
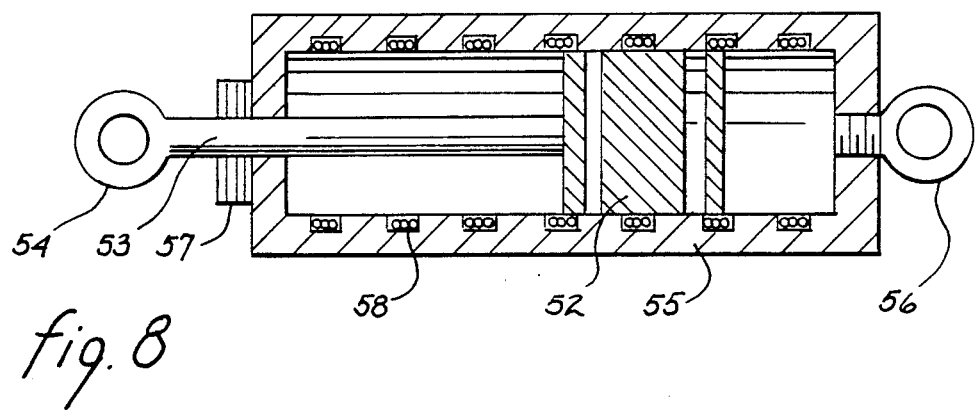
FIG. 8 is another embodiment of the present invention showing the system used as a linear motor for use in applications to provide electromechanical displacement to an external apparatus or device attached to the linear motor.

FIG. 8 illustrates an embodiment of the present invention for use as a linear motor. In this instance the piston 52 is connected to a drive rod 53 having a means of attachment 54 suitable for the particular application. The motor body 55 is also fitted with an attachment means 56. While rings are shown in this illustration it will be obvious that any suitable attachment means, such as threaded fittings, plates or weldments may also be used. A simple electromagnetic brake 57 or other means may be used as desired to prevent unwanted motion when the drive coils 58 are not energized.

Figure 9B:
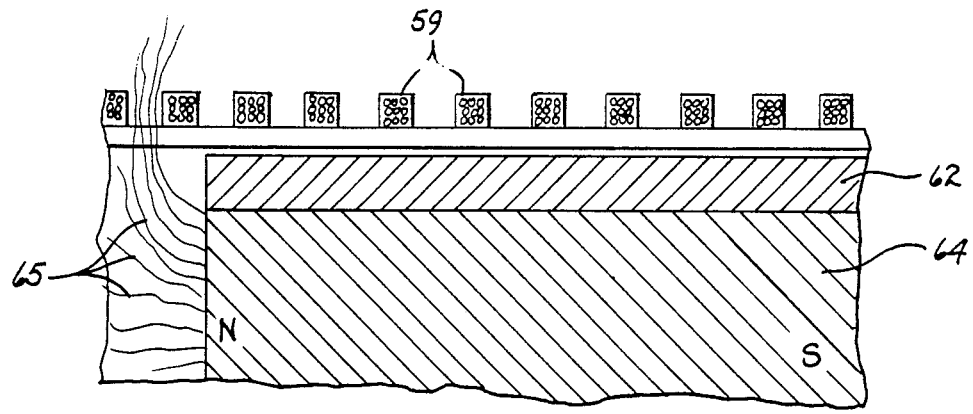
Figure 9B:
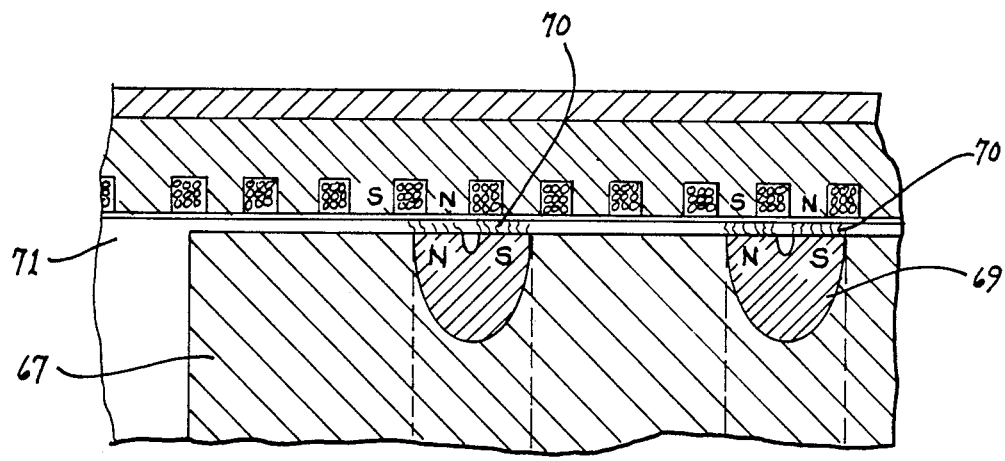

Referring now to FIG. 9a, a schematic representation of a prior art linear motor is shown. A cylinder 58 and drive coils 59, enclose a piston 62 having a permanent magnet 64 disposed therein. The permanent magnet, or in some instances ferromagnetic material without permanent magnetism, is generally aligned longitudinally with respect to the cylinder and the piston. The lines of flux 65 generally emanate from the ends of the piston 62 as shown. In contrast, referring to FIG. 9b, the piston 67 of the present invention is provided with the radially magnetized permanent magnets 69 as shown and described in connection with FIGS. 4, 4a and 4b. It may be seen that the lines of flux 70 are primarily radially directed perpendicular to the annular gap between the piston 67 and cylinder 71; further, it may be seen that the flux concentration is significantly greater in FIG. 9b as a result of the close proximity of the permanent magnet pole faces to the cylinder inner surface. It may also be s-en that the ability of the present invention to concentrate magnetic flux perpendicularly through the annular gap between the cylinder and piston greatly increases the efficacy of the interaction of the flux emanating from the piston and the flux provided by the drive coils. Therefore, greater force is available using the technique of the present invention.

We claim:

1. A linear motor pump comprising:
   (a) a hollow closed cylinder formed by a plurality of axially spaced electrically energizable drive coils, said coils producing magnetic flux when energized;
   (b) ferromagnetic material positioned between and about said coils and extending from an inner surface of said cylinder radially outwardly beyond said coils;
   (c) at least one piston positioned within said cylinder for movement along an axis of said cylinder and forming an annular gap between said cylinder and piston, said piston including means for producing magnetic flux;
   (d) power supply means for energizing said drive coils;
   (e) logic control circuitry connected to said power supply and to said drive coils for controlling the energization of said drive coils;
   (f) piston position sensing means connected to said control circuitry for detecting the position of said piston within said cylinder;
   (g) said control circuitry responsive to said sensing means for selectively energizing said coils to produce a desired piston motion;
   (h) said hollow closed cylinder having an inlet and an outlet for admitting fluid to the cylinder and for discharging fluid from the cylinder; and
   (i) means for sensing temperature and pressure within said cylinder connected to said logic control circuitry for determining optimum piston speed and stroke.

2. The combination set forth in claim 1 wherein said ferromagnetic material comprises a plurality of metal plates extending longitudinally of said cylinder and extending radially outwardly from said inner surface.

3. The combination set forth in claim 2 wherein said metal plates are thin soft iron plates.

4. A linear motor pump comprising:
(a) a hollow closed cylinder formed by a plurality of axially spaced electrically energizable drive coils, said coils producing magnetic flux when energized;
(b) ferromagnetic material positioned between and about said coils and extending from an inner surface of said cylinder radially outwardly beyond said coils;
(c) at least one piston positioned within said cylinder for movement along an axis of said cylinder and forming an annular gap between said cylinder and piston, said piston including means for producing magnetic flux;
(d) power supply means for energizing said drive coils;
(e) logic control circuitry connected to said power supply and to said drive coils for controlling the energization of said drive coils;
(f) piston position sensing means connected to said control circuitry for detecting the position of said piston within said cylinder;
(g) said control circuitry responsive to said sensing means for selectively energizing said coils to produce a desired piston motion;
(h) said hollow closed cylinder having an inlet and an outlet for admitting fluid to the cylinder and for discharging fluid from the cylinder;
(i) means for sensing temperature and pressure within said cylinder connected to said logic control circuitry for determining optimum piston speed and stroke; and
(j) said piston positioning sensing means comprising a voltage sensor and a current sensor connected to said control circuitry for measuring the voltage and current, and the voltage-current lag, of the electrical energy being applied to said drive coils, said logic control circuitry responsive to said measurements for computing piston position.

* * * * *